Vannan & Cramer.
Chills for Castings.
Nº 93,252. Patented Aug. 3, 1869.
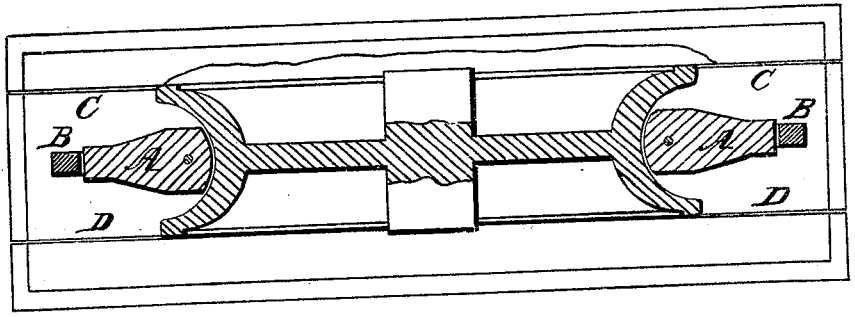
Witnesses.
Wm. A. Morgan.
P. C. Ditench.
Inventor
J. B. Vannan. N. P. Cramer
per Munn & Co
Attorneys.

United States Patent Office.

J. B. VANNAN AND N. P. CRAMER, OF CARBONDALE, PENNSYLVANIA.

Letters Patent No. 93,252, dated August 3, 1869.

IMPROVEMENT IN SHEAVE-PULLEYS.

The Schedule referred to in these Letters Patent and making part of the same.

*To all whom it may concern:*

Be it known that we, J. B. VANNAN and N. P. CRAMER, of Carbondale, in the county of Luzerne, and State of Pennsylvania, have invented a new and useful improved Sheave-Pulley; and we do hereby declare that the following is a full, clear, and exact description thereof, which will enable others skilled in the art to make and use the same, reference being had to the accompanying drawing, forming part of this specification.

This invention relates to improvements in sheave-pulleys, the object of which is to provide sheave-pulleys with a chilled portion of the surface of the groove.

The drawing represents a sectional elevation of a mould for casting the sheaves, with a chill arranged therein.

Hitherto these pulleys have been made with soft surfaces, which soon wear away, and render them unfit for use.

Our invention consists in producing them with the central portion only of the groove chilled, and to this end, we provide in a mould a circular chill, A, made in two parts, and provided with clamps, B, for clamping the projecting ends of each section for holding it while it is being moulded, and for releasing it from the wheel when cast. The clamps B being knocked off, allow the two parts to separate.

The said chill and the pattern, the latter in two parts, may be moulded in a mould having two partings, as represented at C and D.

We are aware that chain-pulleys have been made with chilled projections, but we make no claim to such invention; but What we do claim, and desire to secure by Letters Patent, is—

As a new article of manufacture, a sheave-pulley, having the bottom only of the groove chilled, substantially as set forth.

J. B. VANNAN.
N. P. CRAMER.

Witnesses:
JAS. McMILLAN,
WM. GATHERCOLE.